(12) United States Patent
Liu

(10) Patent No.: US 6,263,783 B1
(45) Date of Patent: Jul. 24, 2001

(54) BROILER FRAME

(76) Inventor: I-Wen Liu, P.O. Box 90, Tainan City (TW)

( * ) Notice: Subject to any disclaimer, the term of this patent is extended or adjusted under 35 U.S.C. 154(b) by 0 days.

(21) Appl. No.: 09/782,317

(22) Filed: Feb. 14, 2001

(51) Int. Cl.[7] .................. A23L 1/00; A47J 37/00; A47J 37/04; A47J 37/07
(52) U.S. Cl. .................. 99/339; 99/340; 99/385; 99/400; 99/401; 99/419; 99/446; 99/447; 99/448; 99/450; 99/482; 126/9 R; 126/25 R
(58) Field of Search .................. 99/337, 338, 339, 99/340, 341, 385–391, 400, 401, 419–421 V, 444–450, 481, 482; 126/25 R, 9 R, 41 R

(56) References Cited

U.S. PATENT DOCUMENTS

| | | | |
|---|---|---|---|
| 3,113,504 | * 12/1963 | Reed | 99/421 H |
| 3,247,827 | * 4/1966 | Cremer | 99/421 H |
| 3,733,999 | * 5/1973 | Bernstein | 99/339 X |
| 4,598,690 | * 7/1986 | Hsu | 126/25 R |
| 4,810,856 | * 3/1989 | Jovanovic | 219/401 |
| 4,924,766 | * 5/1990 | Hitch | 99/421 HV |
| 5,195,425 | * 3/1993 | Koziol | 99/447 X |
| 5,333,540 | * 8/1994 | Mazzocchi | 99/450 X |
| 5,421,318 | * 6/1995 | Unruh et al. | 126/9 R |
| 5,536,518 | * 7/1996 | Rummel | 426/523 |
| 5,649,475 | * 7/1997 | Murphy et al. | 99/421 H |
| 5,819,639 | * 10/1998 | Spell | 99/446 X |
| 5,832,811 | * 11/1998 | King | 99/419 X |

* cited by examiner

Primary Examiner—Timothy F. Simone

(57) ABSTRACT

A broiler frame includes a base, a net, an ash plate, two sloping side plates and a net frame combined together. The broiler frame has good heat concentration, and possible to broil food in various ways, with food to be broiled not sticking to the net, easy to assemble and disassemble for washing and convenient for storing away.

10 Claims, 6 Drawing Sheets

BROILER FRAME

BACKGROUND OF THE INVENTION

1. Field of the Invention

This invention relates to a broiler frame, particularly to one consisting of a base, a net, an ash plate, two sloping side plates and a net frame, and having good effect of heat concentration, usable for various broiling ways, not easily sticking with the net frame, easy to assemble and disassemble for washing, and convenient to store away.

2. Description of the Prior Art

Common conventional broiler frames shown in FIG. 1 generally includes a frame 10, a net 11 deposited on the frame 10, a charcoal grid 12 near the bottom of the frame 10, and a foot unit 13 provided under the frame 10 to stand on the ground. Then charcoal is put on the charcoal grid 12, and food to be broiled is put on the net 11, and charcoal ash falls down on the bottom of the frame 10. However, the conventional broiler frame has the following disadvantages.

1. It has an open structure, impossible to concentrate heat, which easily disperses around, resulting in bad heating effect.

2. Charcoal ash falls down to the bottom of the frame, troublesome to dean it, having to wait until the frame cools down. In addition, during broiling process, two much ash cannot be removed out, affecting burning effect of charcoal.

3. Food has to be deposited directly on the net, so fat coming out of the food being broiled drops down on burning charcoal below the net, giving rise to a large volume of oily smoke, letting a person broiling shed tears and suck in large quantity of smoke to produce damage to person's health.

4. Food to be broiled is placed directly on the net, so part of the food may stick to the net, with charcoal smear sticking on the surface of the food broiled, and with sauce on the food remaining on the net, hard to clean and not hygienic.

5. Flame of charcoal is hardly controlled in its size, liable to bum food excessively, and scorched or charred food is apt to lead to cancer according to medical research.

6. The net is located just above the flame of charcoal, a user cannot reach the hand to move or turn around the food being broiled on the net.

7. It has a large size, not collapsible and inconvenient to store away.

SUMMARY OF THE INVENTION

The main objective of the invention is to offer a broiler frame having good heat concentration and various broiling ways, with food being broiled not sticking to a net, and easy to clean.

Another objective of the invention is to offer broiler frame quick to assemble and disassemble and convenient to store away.

The feature of the invention is a base having a rail groove respectively and oppositely in two side plates, a combine edge respectively provided in each side plate; a net having two sides inserting in the two rail grooves and able to be pulled to slide along;

An ash plate located below the net and able to slide along; two sloping side plates combined on the base and having respectively an upper upright wall facing each other, a lower short stop wall, and the two upper walls connected with connectors; and a net frame provided with a broiling area located been the two upper edges of the two sloping side plates and having a hanging member respectively at two sides.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
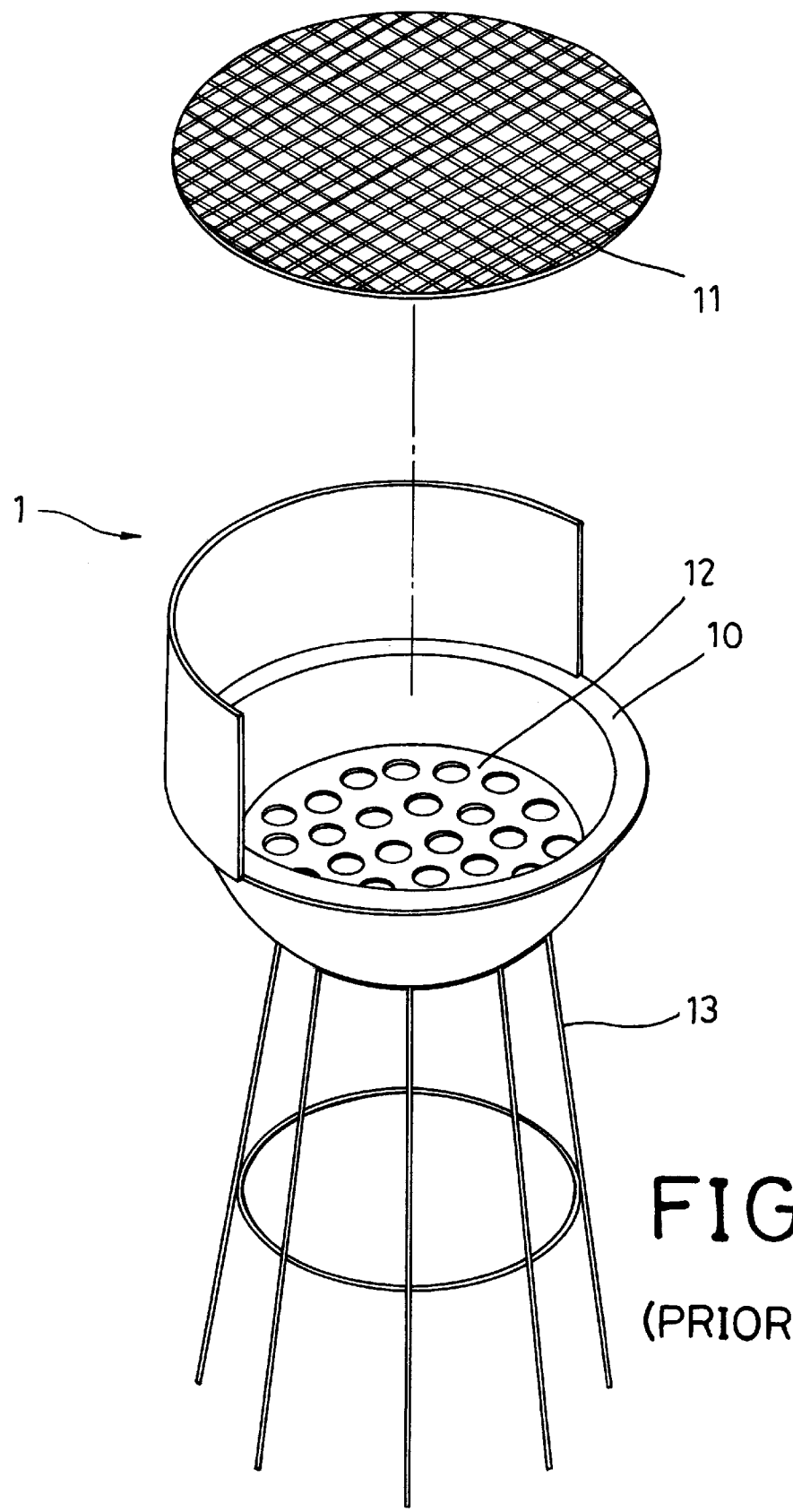
FIG. 1 is a perspective view of a known conventional broiler frame.
Figure 2:
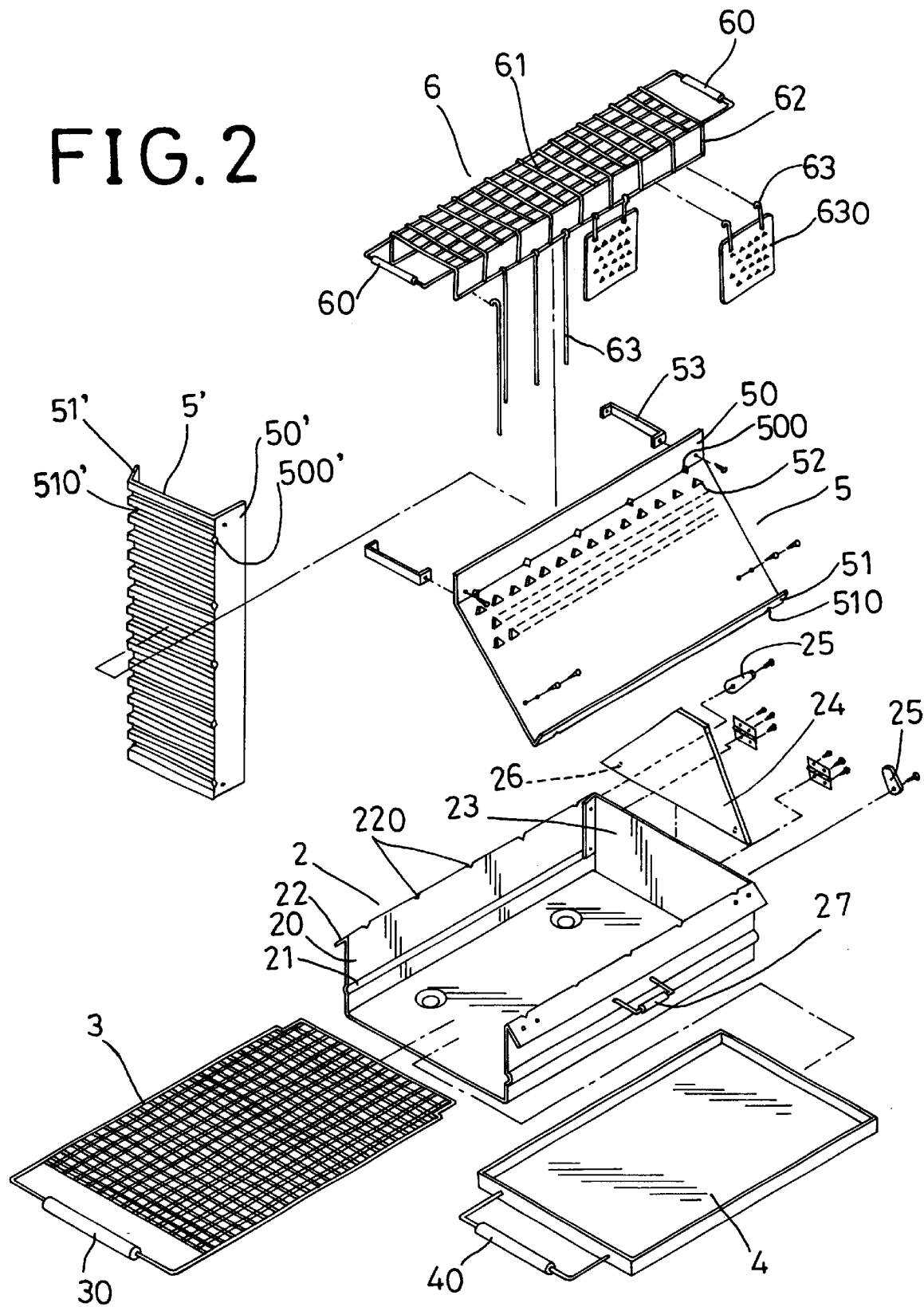
FIG. 2 is an exploded perspective view of a first preferred embodiment of a broiler frame in the present invention.
Figure 3:
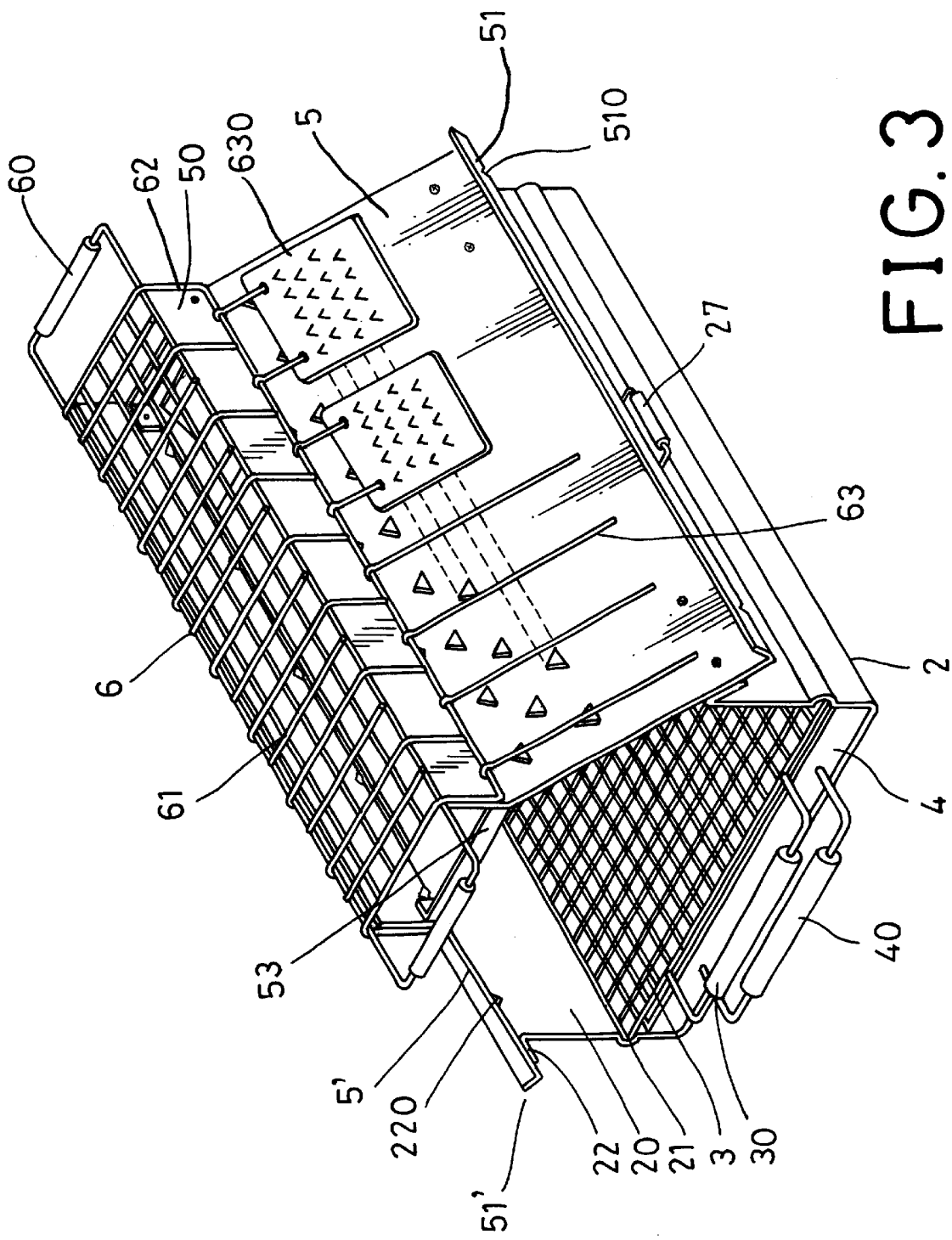
FIG. 3 is a perspective view of the first preferred embodiment of a broiler frame in the present invention.

A first preferred embodiment of a broiler frame in the present invention, as shown in FIGS. 2 and 3, includes a base 2, a net 3, an ash plate 4, two sloping side plates 5, 5', and a net frame 6 as main components combined together.

The base 2 has two lengthwise side plates 20 provided with two opposite rail grooves 21, a lengthwise combine wall 22 formed to bend outward sloping down from an upper end of the two side plates 20, plural notches 220 formed spaced apart equidistantly in the combine edges 22, a stop plate 23 formed between the rear ends of the two side plates 20, a shaped swing plate 24 pivotally connected to an upper end of the stop plate 23, a stop 25 respectively combined revolvable with two pivotal connecting points of the stop plate 23 and the swing plate 24, and a stud 26 fixed respectively on two sides of an inner surface of the swing plate 24 to stop the swing plate 24 when the stop 25 rotates to a preset position to let the swing plate 24 stand up. Further, the side plates 20 have a grip 27 respectively.

The net 3 has two sides fitting in the rail grooves 21 of the base and able to slide along, a pull grip 30 formed in an outer side and an inner side is stopped by the stop plate 23 immovable, and charcoal or lava stone may be laid on the net 3.

The ash plate 4 is provided under the net 3, having a pull grip 40 flexed on an outer side and an inner side stopped by the stop plate 23 of the base. The ash plate 4 may receive the charcoal ash or a gas burner to burn the lava stone placed on the net 3 so that the lava stone may permit gas completely burn to become radiant heat by means of the capillary phenomenon lava stone has, not producing smoke.

The two sloping side plates 5, 5' are combined on the base 2, screwed on with the combine walls 22 of the two side plates 20 of the base 2, respectively sloping down on the two side plates 20 to a certain length, and having an upper straight lengthwise wall 50, 50' respectively facing to each other with a distance and a lower lengthwise bent-up stop strip 51, 51' respectively. Further, the lower ends of the upper straight walls 50, 50' and the lower bent-up stop strips 51, 51' all have plural small recesses 500, 500' for reinforcing, oil stop members 510, 510' fixed on the lower bent-up stop strips 15, 51' respectively to prevent oil from leaking down. The first sloping side plate 5 further has a plurality of projecting saw-teeth hooks 52 formed on the upper surface of an upper portion, and the second sloping side plate 5' has a corrugated shape on an upper surface. Further, the upper straight walls 50, 50' of the two side sloping plates 5, 5' are connected with two U-shaped connectors 53 screwed them with each other.

The net frame 6 is positioned between the upper lengthwise walls 50, 50' of the two sloping side plates 5, 5', having a grip 60 formed respectively on two opposite sides and protruding out of the opposite ends of the two sloping side plates 5, 5', and a broiling area 61 formed on an upper surface between the two grips 60. The net frame 6 further has two lengthwise sides bent down upright to form hanging member 62 respectively to extend just beside the upper lengthwise walls 50, 50' of the two sloping side plates 5, 5', and plural hang rods 63 for pricking food thereon to hang on the hanging members 62. The hanging members 62 may be shaped a elongate rod or a short rod fixed with a hang disc 630 preferably having plural saw-toothed hooks for hooking food for broiling.

Figure 4:
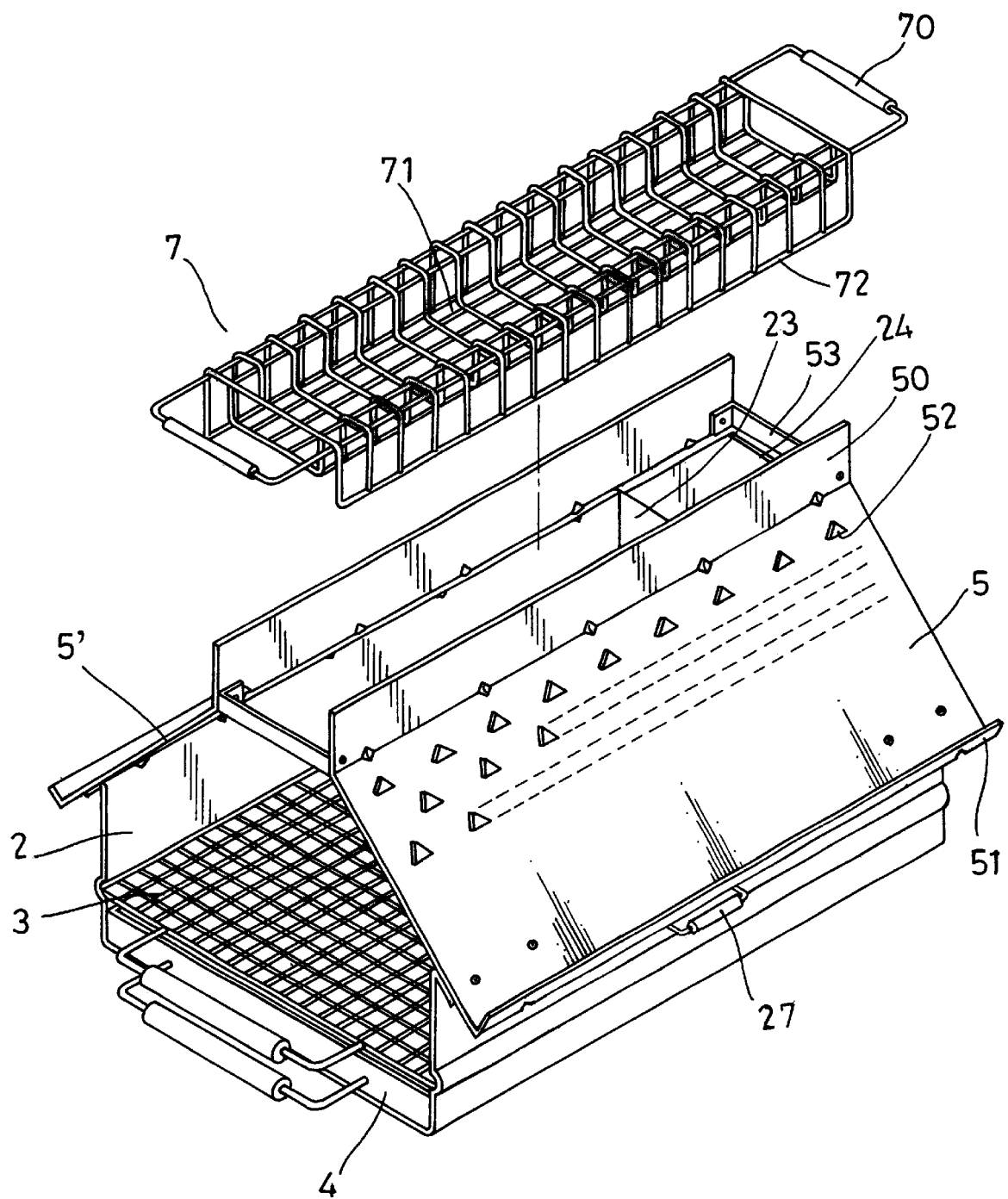
FIG. 4 is a perspective view of a second preferred embodiment of a broiler frame in the present invention.
Figure 5:
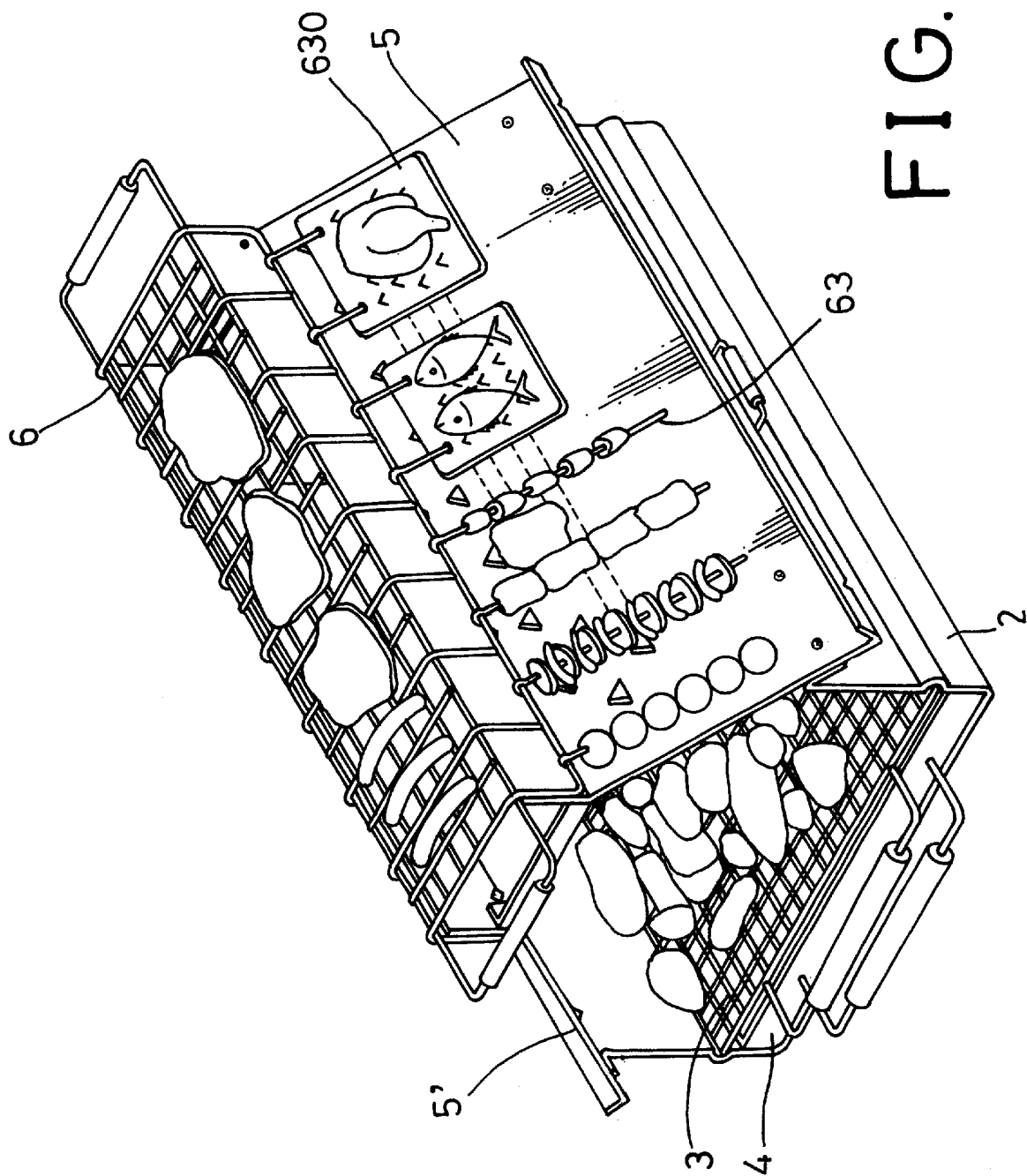
FIG. 5 is a perspective view of the first preferred embodiment of a broiler frame in the present invention, showing various foods being broiled on it; and, FIG. 6 is a side view of the second preferred embodiment of a broiler frame in the present invention, showing is being used.
Figure 6:
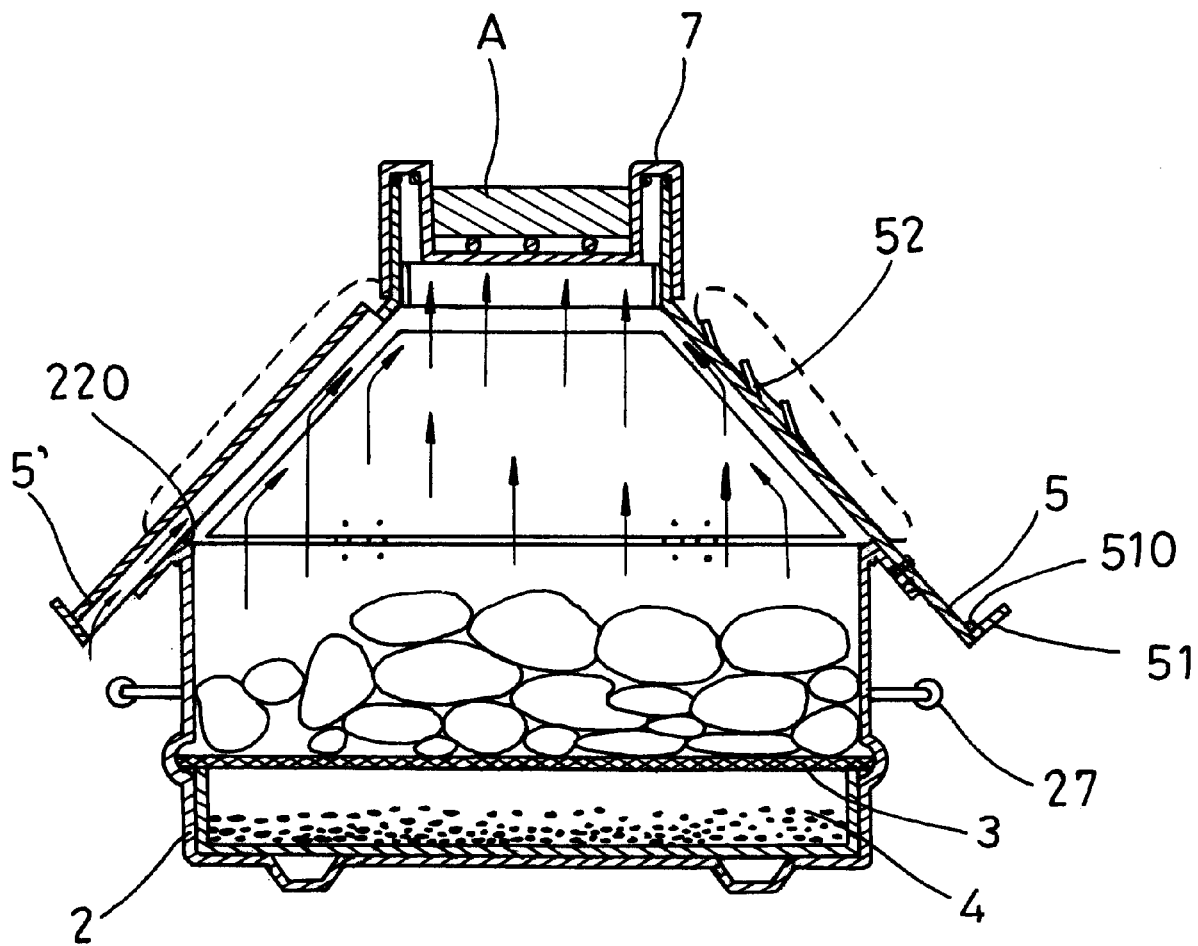

Next, a second preferred embodiment of a broiler frame is shown in FIGS. 4 and 6, having the same structure as the first one except a net frame 7 instead of the net frame 6 in the first one. The net frame 7 has two pull grips 70 formed in two opposite ends, a recessed intermediate lengthwise broiling area 71 formed between the two pull grips 70. Then food to be broiled is directly placed on the recessed broiling area, or stones A or an iron plate (used in Teppanyaki) or a ceramic plate may be placed there on to make broiling by burning the stones, the iron plate or the ceramic plate as shown in FIG. 6 for various uses. The net frame 7 may also has hanging members 72 formed in two lengthwise sides as that 62 in the first embodiment.

In using, as shown in FIGS. 3, 4, 5 and 6, firstly screw the two sloping plates 5, 5' respectively with the combine walls 22 of the base 2, and then connect the two upper lengthwise walls 50, 50' of the two sloping side plates 5, 5' with the two connectors 53 by means of screws. Next, swing up the swing plate 24 pivotally connected to the stop plate 23 of the base 2 and rotate the stops 25 until they are stopped by the studs 26 on the swing plate 24 in place to let the swing plate stand upright and located near the two sloping side plates 5, 5'. Then insert the net 3 in the base 2 by means of the two sides of the net 3 sliding along in the rail grooves 21 of the base 2, and place the ash plate 4 under the net 3. After that, charcoal or lava stones are laid on the net 3. If lava stone is used, a gas burner is placed on the ash plate 4. Lastly, place the net frame 6 or 7 between the upper upright walls 50, 50' of the two sloping side plates 5, 5'. Then the broiling frame in the invention is ready for use.

The broiler frame in the invention has the following advantages, as can be understood from the aforesaid description.

1. Its components are easy to assemble and disassemble, convenient to store away by reducing its dimensions.

2. Heat concentration is better than the conventional ones, as the base has the two side plates, the stop plate and the swing plate at a rear side and the two sloping side plates surrounding the heat produced by charcoal or gas.

3. The two sloping side plates and the net frame can be used for broiling in American style or Japanese style (Teppanyaki), using charcoal, lava stone, an iron plate, a ceramic plate, skewers, etc. broiling at the same time with various ways.

4. Food may not stick to the net by using hanging rods for skewers.

5. The ash plate is convenient to clean ash falling thereon.

6. The sloping side plates have the plural saw-toothed hooks for keeping food placed thereon stabilized and not falling down, permitting the food receiving balanced heat from the sloping side plates to result in comparatively good broiling effect, and the lower stop strips may collect oil flowing down.

7. The stop member fixed on the lower stop strips of the sloping side plates can prevent oil getting out of the food being broiled from flowing out along the lower stop strips.

8. The plural recesses formed on the combine walls of the base can reinforce the combine walls, and let outer cool air to enter to assist burning of charcoal or gas so that the charcoal or gas in the broiler frame may burn completely, not producing dense smoke, and cool air may flow along the sloping side plates to cool a little the temperature of them to prevent them from becoming too hot to scorch the food.

9. Some ventilation gaps are formed between the second corrugated sloping side plate and the connect line of the combine walls of the base, letting outer air to enter to assist the charcoal in the broiler frame to bum well, and the sloping side plates not only have radiant heat, the side plates of the base also let fresh air flow in convection, reducing heat to prevent the food from scorching.

While the preferred embodiments of the invention have been described above, It will be recognized and understood that various modifications may be made therein and the appended claims are intended to cover all such modifications that may fall within the spirit and scope of the invention.

What is claimed is:

1. A broiler frame comprising:
   a base having two side parallel plates respectively provided with a horizontal rail groove, and a combine wall formed respectively to bend down from an upper end of each said side parallel plate;
   a net having two opposite lengthwise side movably inserted in said two rail grooves of said two side parallel plates of said base;
   an ash plate movably provided under said net;
   two sloping side plates for placing food to be broiled combined with said base, respectively having an upper upright lengthwise wall facing each other with a distance and a lower stop short lengthwise wall, two connectors provided to connect two sides of said upper upright lengthwise walls of said two sloping side plates;
   a net frame fixed between said two upper upright lengthwise walls of said two sloping side plates, having lengthwise broiling area and a hanging member formed respectively at two sides and extending down; and,
   said broiler frame being quick to assemble and disassemble, convenient to store away, having good heat concentration, with food being broiled not sticking to said net, and having various broiling ways.

2. The broiling frame as claimed in claim 1, wherein said base has a stop vertical plate formed in a rear side, a shaped swing plate pivotally connected to said stop plate and possible to be swung up to stand upright on said stop plate, a rotatable stop provided between pivot points between said swing plate, a stud provided at two sides of said swing plate to stop said stops when said stops are pivotally rotated to keep said swing plate stand upright, and a grip provided at an outer side of each said side plate of said base for carrying said broiler frame.

3. The broiling frame as claimed in claim 1, wherein one of said two sloping side plates has a corrugated upper surface, and the other of said sloping side plates has an upper portion provided with plural saw-toothed hooks.

4. The broiling frame as claimed in claim 1, wherein said combine edges of said base and said upper upright lengthwise walls of said two sloping side plates are provided with plural recesses spaced apart equidistantly for reinforcing means, and said lower stop strips of said two sloping side plates are provided with a stop member for preventing oil from leaking down.

5. The broiler frame as claimed in claim 1, wherein said net and said ash plate are all provided with a pull grip at one end respectively.

6. The broiler frame as claimed in claim 1, wherein said net frame has a pull grip provided on first two sides, a hang member respectively provided at second two sides extending down, a recessed broiling area formed in a lengthwise intermediate portion for placing stones, an iron plate, a ceramic plate or smashed stones for various broiling ways.

7. The broiler frame as claimed in claims 1 or 6, wherein said hang members of said net frame is used for hanging skewers with food pricked thereon for broiling, and said skewers are elongate rods.

8. The broiler frame as claimed in claim 7, wherein said hanging skewers are short rods respectively fixed with a hanging disc.

9. The broiler frame as claimed in claim 1, wherein said ash plate is used for collecting ash of charcoal.

10. The broiler frame as claimed in claim 1, wherein said ash plate is used for placing a gas burner thereon, and lava stones are laid on said net.

* * * * *